US010449713B2

(12) United States Patent
Deshmukh et al.

(10) Patent No.: US 10,449,713 B2
(45) Date of Patent: Oct. 22, 2019

(54) ARTICLE AND METHOD OF FORMING AN ARTICLE

(71) Applicant: TYCO ELECTRONICS CORPORATION, Berwyn, PA (US)

(72) Inventors: Ranjan Deepak Deshmukh, Mechanicsburg, PA (US); Jessica H. B. Hemond, Mifflintown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 475 days.

(21) Appl. No.: 15/005,436

(22) Filed: Jan. 25, 2016

(65) Prior Publication Data
US 2017/0210079 A1    Jul. 27, 2017

(51) Int. Cl.
*B29C 64/118* (2017.01)
*B29C 71/00* (2006.01)
(Continued)

(52) U.S. Cl.
CPC .......... *B29C 64/118* (2017.08); *B29C 64/106* (2017.08); *B29C 64/40* (2017.08);
(Continued)

(58) Field of Classification Search
None
See application file for complete search history.

(56) References Cited

U.S. PATENT DOCUMENTS 5,248,456 A * 9/1993 Evans, Jr. ............... B33Y 40/00
                                                   118/423
5,503,785 A * 4/1996 Crump .................. B33Y 10/00
                                                   264/308
(Continued)

FOREIGN PATENT DOCUMENTS

DE    102009061069 A1    6/2011
EP        2514775 A     10/2012
(Continued)

OTHER PUBLICATIONS

J. (2013). Advanced Finishing PLA prints. Retrieved Nov. 11, 2018, from https://reprap.org/forum/read.php?1,193644,193662 (Year: 2013).*

(Continued)

*Primary Examiner* — Seyed Masoud Malekzadeh
*Assistant Examiner* — Manley L Cummins, IV

(57) ABSTRACT

An article and a method of forming an article are provided. The article includes a thermoplastic build material and a polymeric support material. The polymeric support material is selectively removable from the thermoplastic build material through immersion in a solvent. The method of forming an article includes forming a part through additive manufacturing with a thermoplastic build material and a polymeric support material, immersing the part in a solvent, selectively softening the polymeric support material with the solvent, removing the part from the solvent, and separating the polymeric support material from the thermoplastic build material. Another method of forming an article includes forming a part through additive manufacturing with a thermoplastic build material and a polymeric support material, immersing the part in a solvent, selectively dissolving the polymeric support material with the solvent, and removing the thermoplastic build material from the solvent.

10 Claims, 3 Drawing Sheets

(51) Int. Cl.
  B33Y 70/00 (2015.01)
  B29C 64/106 (2017.01)
  B29C 64/40 (2017.01)
  B29C 33/52 (2006.01)
  B33Y 10/00 (2015.01)
  B33Y 40/00 (2015.01)
  B33Y 80/00 (2015.01)
  B29K 101/12 (2006.01)
  B29K 279/00 (2006.01)
  B29K 81/00 (2006.01)

(52) U.S. Cl.
  CPC .......... B29C 71/0009 (2013.01); B33Y 70/00 (2014.12); *B29C 33/52* (2013.01); *B29C 2071/0027* (2013.01); *B29K 2081/06* (2013.01); *B29K 2101/12* (2013.01); *B29K 2279/085* (2013.01); *B29K 2879/085* (2013.01); *B33Y 10/00* (2014.12); *B33Y 40/00* (2014.12); *B33Y 80/00* (2014.12)

(56) References Cited

U.S. PATENT DOCUMENTS

| | | |
|---|---|---|
| 8,123,999 B2 | 2/2012 | Priedeman, Jr. et al. |
| 9,138,981 B1 | 9/2015 | Hirsch et al. |
| 2003/0004600 A1* | 1/2003 | Priedeman, Jr. ...... B29C 41/003 700/119 |
| 2005/0059569 A1 | 3/2005 | Kaneko |
| 2008/0169585 A1* | 7/2008 | Zinniel ............... B29C 71/0009 264/401 |
| 2012/0162305 A1* | 6/2012 | Swanson ............. B29C 67/0055 347/20 |
| 2015/0024316 A1* | 1/2015 | Orrock ................... G03G 13/08 430/108.3 |
| 2015/0344694 A1* | 12/2015 | Wu ......................... C08L 91/06 264/308 |

FOREIGN PATENT DOCUMENTS

| | | |
|---|---|---|
| GB | 2513571 A | 5/2014 |
| JP | 2014083744 A | 5/2014 |
| WO | 2015/056232 A1 | 4/2015 |

OTHER PUBLICATIONS

Dissolving PLA. (Aug. 5, 2012). Retrieved Nov. 11, 2018, from http://www.vinland.com/blog/?p=68 (Year: 2012).*

Christiana, J. (Aug. 3, 2013). How to dissolve support material. Video 2. Retrieved Nov. 11, 2018, from https://www.youtube.com/watch?v=Divwwdzvv7l (Year: 2013).*

Christiana, J. (Aug. 4, 2013). How to dissolve support material. Video 3. Retrieved Nov. 11, 2018, from https://www.youtube.conn/watch?v=41WS5QEJ7U0. (Year: 2013).*

International Search Report dated Apr. 20, 2017, for International Patent Application No. PCT/US2017/014958.

* cited by examiner

ARTICLE AND METHOD OF FORMING AN ARTICLE

FIELD OF THE INVENTION

The present invention is directed to an article and a method of forming an article. More particularly, the present invention is directed to an article having a removable support material and a method of selectively removing a support material from an article.

BACKGROUND OF THE INVENTION

Additive manufacturing (AM) is a term generally used to describe various manufacturing processes involving formation of an object through buildup of one or more materials. For example, one type of additive manufacturing process includes three-dimensional (3D) printing, which involves layer-by-layer deposition of building materials from a printing device. The building materials are usually deposited in a pre-determined shape and/or geometry corresponding to a desired shape of the object being formed. Once solidified or cured, the building materials form the object, with the pre-determined shape and/or geometry of the deposited building material providing a net or near-net shape of the object.

While some objects may be formed by depositing only the building material, the forming of many other objects also includes depositing a separate support material. The support material provides support to the building material during the additive manufacturing of the object, and may also guide vertical placement of subsequent building material layers. However, after completing the additive manufacturing, the support material must be removed to form the final object.

Although there are different methods for removing the support material from the final object, each method suffers from one or more drawbacks. For example, while some objects may be formed with a soluble support, removing the currently available soluble support materials often includes using harsh chemicals and/or requires long processing times. In addition to being dangerous and often expensive, the harsh chemicals may damage or degrade the building material, particularly when long processing times are employed. However, certain building materials are not compatible with the currently available soluble support materials due to compositional and/or processing incompatibilities. For these building materials, the non-soluble support is typically removed manually, which is difficult for complex objects and may also present safety concerns based upon the tools used for support removal. Furthermore, the tools may not be able to completely remove the support material from complex shapes without damage to the parts.

A solvent, a composite article, and a method of forming a composite article that show one or more improvements in comparison to the prior art would be desirable in the art.

BRIEF DESCRIPTION OF THE INVENTION

In an embodiment, an article includes a thermoplastic build material and a polymeric support material. The polymeric support material is selectively removable from the thermoplastic build material through immersion in a solvent.

In another embodiment, a method of forming an article includes forming a part, the forming of the part including additive manufacturing with a thermoplastic build material and a polymeric support material, immersing the part in a solvent, selectively softening the polymeric support material with the solvent, removing the part from the solvent, and separating the softened polymeric support material from the thermoplastic build material to form the article.

In another embodiment, a method of forming an article includes forming a part, the forming of the part including additive manufacturing with a thermoplastic build material and a polymeric support material, immersing the part in a solvent, selectively dissolving the polymeric support material with the solvent, and removing the thermoplastic build material from the solvent. Selectively dissolving the polymeric support material removes the polymeric support material from the thermoplastic build material.

Other features and advantages of the present invention will be apparent from the following detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an article and a method of forming an article. Embodiments of the present disclosure, for example, in comparison to concepts failing to include one or more of the features disclosed herein, provide a build material for use in additive manufacturing, provide a support material for use in additive manufacturing, provide a method for selectively removing a support material from a build material, provide a solvent for selectively removing a support material from a build material, provide a solvent for selectively swelling a support material, provide a solvent for selectively dissolving a support material, decrease processing time, decrease or eliminate manual removal of support materials, provide complete removal of support materials from complex shapes, decrease or eliminate use of sharp tools for support material removal, or a combination thereof.

Figure 1:
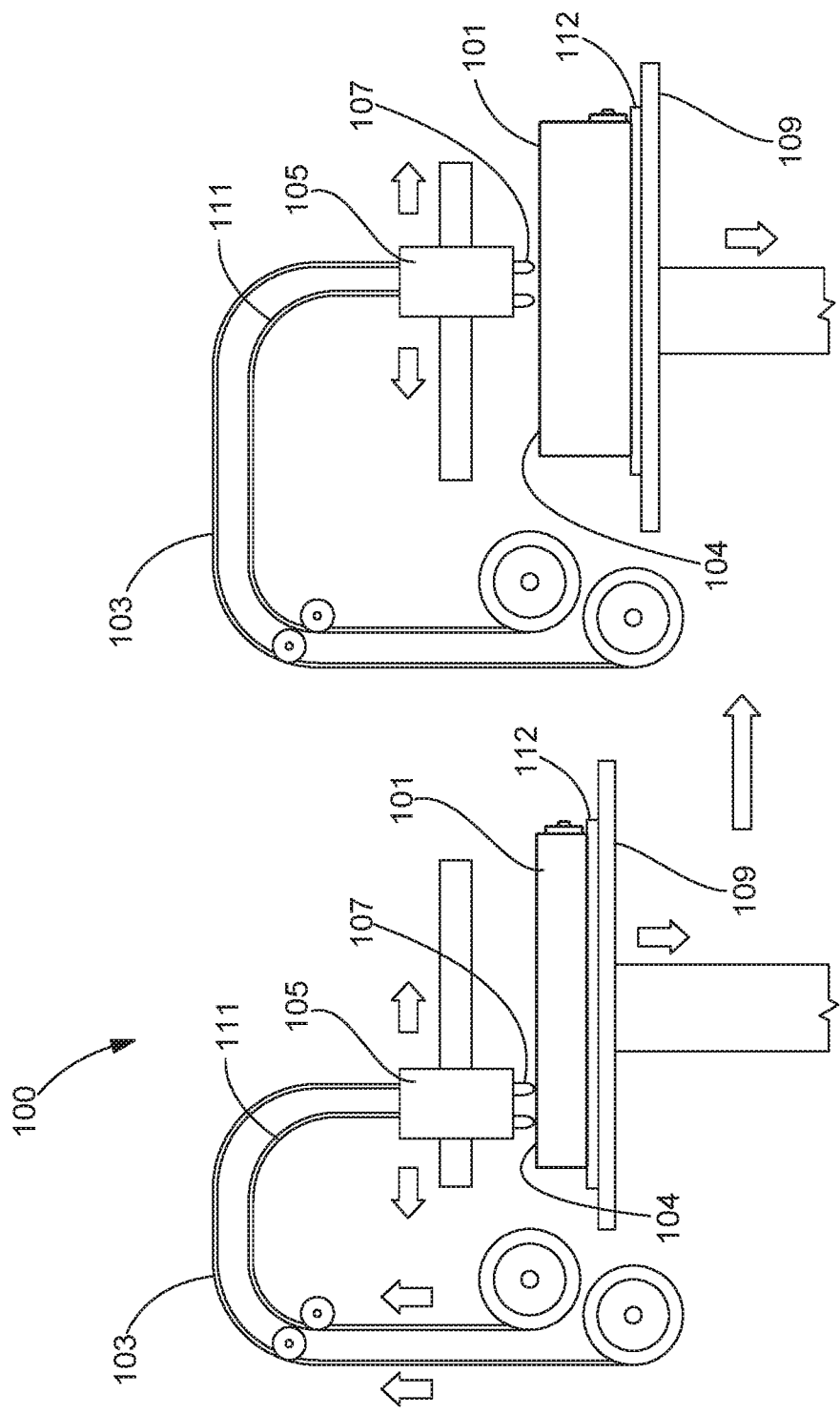
FIG. 1 is a process view of a method of forming an article, according to an embodiment of the disclosure.

Referring to FIG. 1, a method 100 of forming an article 101 includes any suitable additive manufacturing technique. One suitable additive manufacturing technique includes a filament and/or extrusion based process, such as, but not limited to, fused filament fabrication (FFF), fused deposition modeling (FDM), melt extrusion modeling, or a combination thereof. Although described herein primarily with regard to extrusion based processes, as will be understood by those skilled in the art, the additive manufacturing technique is not so limited and may include any other process suitable for use with one or more of the composite formulations disclosed herein. Other suitable additive manufacturing processes include, but are not limited to, polymer jetting, monomer jetting, binder jetting, or a combination thereof.

In one embodiment, as illustrated in FIG. 1, the FDM process includes providing a build material 103, feeding the build material 103 to a printing head 105, heating the build material 103, extruding a heated build material 104 through a nozzle 107 in the printing head 105, and depositing one or more layers of the heated build material 104 either on a build sheet 112 secured to a base or platform 109 or directly on the base or platform 109 to form the article 101. During the extrusion of the heated build material 104, the printing head 105 and/or the platform 109 are moved relative to each other, the relative movement depositing each of the one or more layers of the heated build material 104 in a predetermined pattern. For example, in another embodiment, the printing head 105 is moved laterally, in a first plane, and the platform 109 is moved vertically, in a second plane perpendicular to the first. Together, the lateral and vertical movement of the printing head 105 and the platform 109 form the predetermined pattern of each layer of heated build material 104. In an alternate embodiment, the platform 109 is a multi-axis platform configured to provide three-dimensional movement corresponding to the predetermined pattern.

The one or more layers of the heated build material 104 are joined together to form the article 101, with the predetermined patterns of the one or more layers combining to form a desired three-dimensional shape and/or geometry of the article 101. In certain embodiments, a support material 111 is co-deposited with the heated build material 104 to support the heated build material 104 on the platform 109. For example, the support material 111 may be deposited adjacent to, beneath, and/or over the heated build material 104 to form shapes and/or features between layers of the heated build material 104, and/or to decrease or eliminate movement of the heated build material 104 on the build sheet 112 or the platform 109.

The build material 103 and/or the support material 111 are provided to the printing head 105 in any suitable form and include any suitable material or combination of materials for forming the article 101. Suitable forms of the build material 103 and/or the support material 111 include, but are not limited to, a filament, a sheet, a powder, a paste, pellets, or a combination thereof. Suitable build materials include any material suitable for use in an additive manufacturing technique and/or for providing desired properties of the article 101. For example, in one embodiment, the build material 103 includes, but is not limited to, one or more thermoplastics. In another embodiment, the build material 103 includes a polyetherimide (PEI), such as, but not limited to, Ultem™ 9085 (a blend of PEI as a major component and polycarbonate), which is commercially available from Stratasys Inc., in Eden Prairie, Minn. Other suitable build materials include, but are not limited to, polyamides, nylons, polycarbonate (PC), polyesters, polyvinylidene fluoride (PVDF), polyetheretherketone (PEEK), polyetherketoneketone (PEKK), polyphenylsulfone (PPSU), polyphenylenesulfide (PPS), other polyetherimides, a blend including, but not limited to, any of the build materials listed above, a copolymer including, but not limited to, and of the build materials listed above, or a combination thereof. Suitable support materials include any material suitable for use with the build material 103 and/or in an additive manufacturing technique. For example, in a further embodiment, the support material 111 includes, but is not limited to, polysulfone (PSU), polyethersulfone (PES), polyphenylsulfone (PPSU), any other polyarylsulfone, any other sulfone polymer, a blend of the above, a copolymer of the above.

Figure 2:
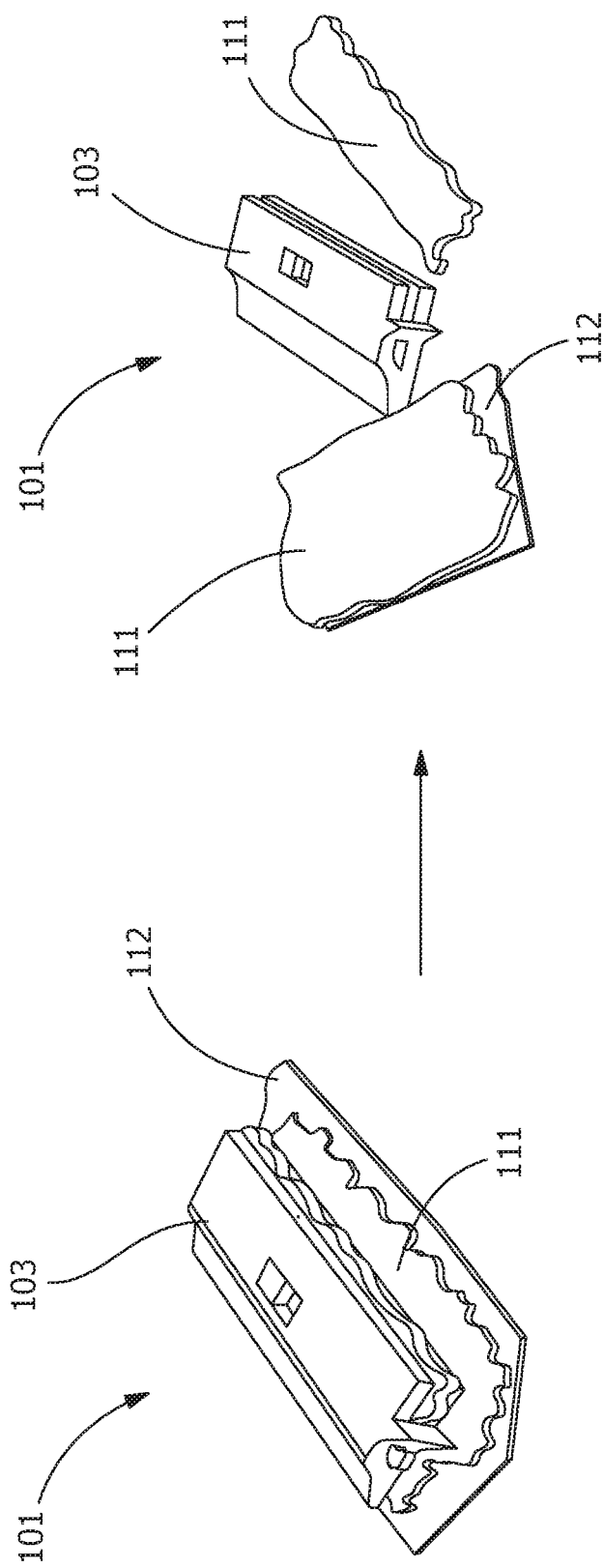
FIG. 2 is a process view of a method of removing a support material from an article, according to an embodiment of the disclosure.
Figure 3:
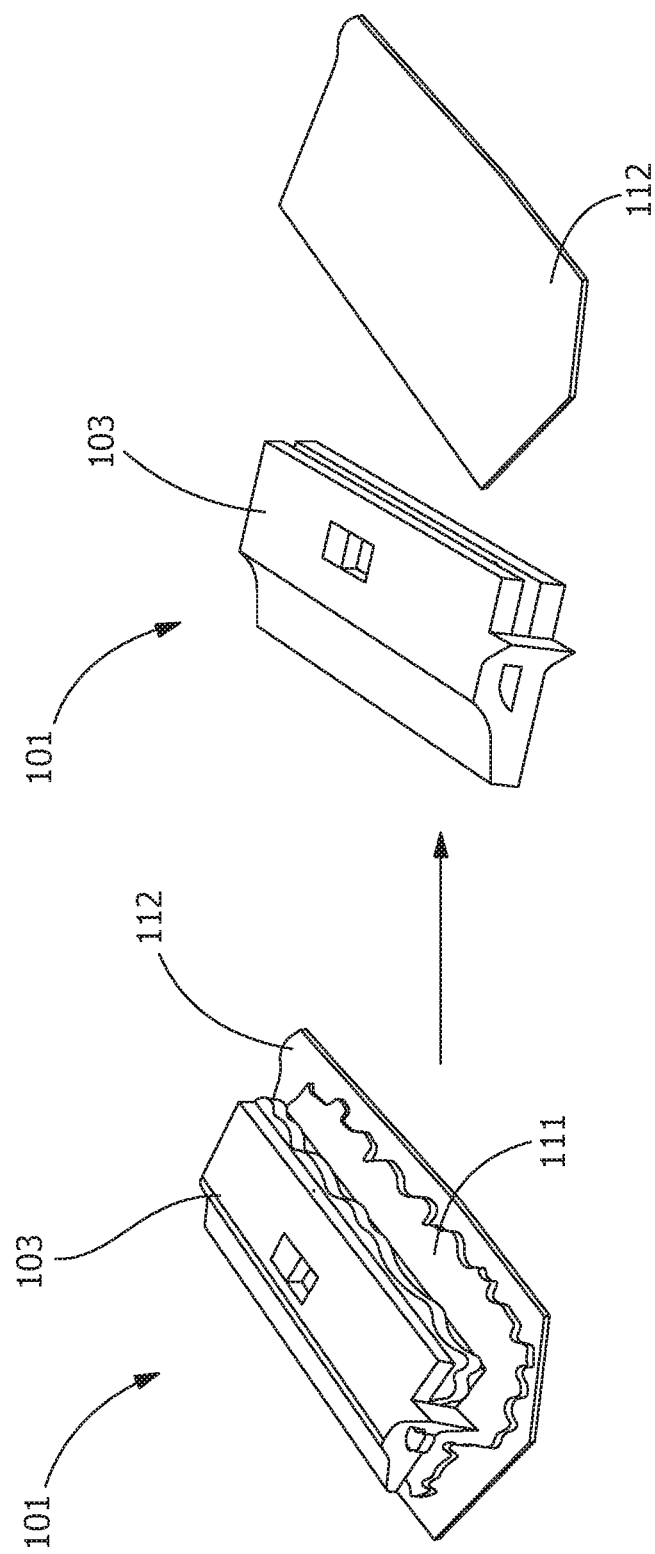
FIG. 3 is a process view of a method of removing a support material from an article, according to another embodiment of the disclosure.

Turning to FIGS. 2-3, in one embodiment, the co-deposited support material 111 adheres to the build material 103 during the additive manufacturing process. In another embodiment, forming the article 101 includes removing the support material 111 from the build material 103. In a further embodiment, removing the support material 111 includes exposing the build material 103 and the support material 111 of the article 101 to a solvent that selectively softens (FIG. 2) and/or dissolves (FIG. 3) the support material 111 without or substantially without softening and/or dissolving the build material 103. For example, the selective softening and/or dissolving of the support material 111 may include immersing the support material 111 and the build material 103 in the solvent for any suitable amount of time to soften and/or dissolve the support material 111 without or substantially without softening and/or dissolving the build material 103.

Referring to FIG. 2, the selective softening of the support material 111 separates or facilitates separation of the support material 111 from the build material 103. In one embodiment, the selective softening of the support material 111 includes, but is not limited to, solvent induced swelling of the support material 111, solvent induced crazing of the support material 111, solvent induced cracking of the support material 111, solvent induced alteration of the support material 111, or a combination thereof. In another embodiment, the selective softening of the support material 111 includes reducing adhesion between the support material 111 and the build material 103, delaminating the support material 111 from the build material 103, or a combination thereof. In a further embodiment, after the selective softening, the support material 111 is manually (e.g., pulling and/or grabbing with tweezers or other gripping tools) or mechanically (e.g., vibration, stirring, water jet, shot peening, ultrasonic) removed from the build material 103. For example, the selective softening of the support material 111 may include immersing the support material 111 and the build material 103 in the solvent, swelling the support material 111 into a gel or gel-like state, and then separating the softened support material 111 from the build material 103.

Suitable solvents for selectively softening the support material 111 include, but are not limited to, n-propyl bromide, 1-bromopropane, isopropyl bromide, other propyl bromides, transdichloroethylene, 1,1,1,2,3,4,4,5,5,5-decafluoropentane, butanone (methyl ethyl ketone (MEK)), acetone, acetylacetone, other halogenated hydrocarbons, ketones, or a combination thereof. In some cases, the solvents may include additives such as stabilizers. Suitable stabilizers include, but are not limited to, by weight, up to about 1% nitromethane, between 0.01% and 1% nitromethane, between 0.05% and 1% nitromethane, between 0.1% and 1% nitromethane, up to about 1% by weight 1,2 butylene oxide, between 0.01% and 1% 1,2 butylene oxide, between 0.05% and 1% 1,2 butylene oxide, between 0.1% and 1% 1,2 butylene oxide, any other suitable stabilizer, or a combination thereof. For example, in one embodiment, the solvent includes n-propyl bromide stabilized with up to 0.6% by weight nitromethane and/or up to 0.6% by weight 1,2 butylene oxide. Suitable amounts of time for selectively softening the support material 111 include, but are not limited to, about 1 hour, about 2 hours, about 3 hours, about 4 hours, about 5 hours, between 1 and 5 hours, up to about 10 hours, up to about 15 hours, up to about 20 hours, up to about 24 hours, up to about 36 hours, up to about 48 hours, up to about 96 hours, or any combination, sub-combination, range, or sub-range thereof. As will be appreciated by those skilled in the art, the time required will vary depending upon the geometry of the build material from which the support material needs to be removed and also the overall volume of the support material.

Referring to FIG. 3, the selective dissolving of the support material 111 includes substantially or completely removing the support material 111 from the build material 103 while immersed in the solvent. For example, in one embodiment, selectively dissolving the support material 111 includes immersing the support material 111 and the build material 103 in the solvent, stirring the solvent with a magnetic stir bar or other mechanical means, completely dissolving the support material 111, removing the build material 103 from the solvent, and drying the build material 103 to form the article 101. The drying of the build material 103 removes any excess solvent, and includes any suitable drying method, such as, but not limited to, under vacuum, at room temperature, at elevated temperature, or a combination thereof.

Suitable solvents for selectively dissolving the support material 111 include, but are not limited to, n-methyl 2-pyrollidone (NMP), mixture of dimethyl sulfoxide and toluene, or a combination thereof. Other co-solvents that may be added to the solvents above to aid dissolution include, but are not limited to, dichloromethane, n-n-dimethylformamide (DMF), or a combination thereof. Suitable amounts of time for selectively dissolving the support material 111 include, but are not limited to, about 0.25 hours, about 0.5 hours, about 0.75 hours, up to about 1 hour, up to about 2 hours, up to about 3 hours, up to about 4 hours, up to about 5 hours, up to about 10 hours, between about 0.1 hours and about 10 hour, between about 0.1 hours and about 5 hours, between about 0.5 hours and about 5 hours, between about 0.5 hours and about 3 hours, or any combination, sub-combination, range, or sub-range thereof. Although the solvent begins dissolving the support material 111 without swelling or dissolving the build material 103, as will be appreciated by those skilled in the art, in some embodiments, the build material 103 may begin to swell or dissolve after prolonged exposure to certain solvents. When immersed in these solvents, the immersion time is selected to decrease or eliminate swelling and/or dissolving of the build material 103 while substantially or completely dissolving the support material 111.

Exemplary embodiments are further described and illustrated with respect to the following examples which are presented by way of explanation, not limitation.

EXAMPLES

Example 1

In one example, a polyetherimide build material (Ultem™ 9085) and a polysulfone support material were printed into a three-dimensionally (3D) article using a Stratasys Fortus 400 mc or 900 mc machine. The 3D printed article was then immersed in a stabilized n-propyl bromide or 1-bromopropane solvent (commercially available as Ensolv) for up to 24 hours. The solution was optionally stirred using a magnetic stir bar or other mechanical means. While immersed in the solvent, the polysulfone support areas of the article softened and swelled into a gel-like state, and/or partially delaminated from the polyetherimide areas of the article. In contrast, the polyetherimide areas of interest did not swell or deform and the original dimensions were maintained through the solvent treatment and subsequent steps listed below. In another instance, a printed article was intentionally exposed to stabilized n-propyl bromide for an extended period of time of 96 hours. Even after the extended solvent exposure the polyetherimide areas of the article did not swell or deform.

After immersion, the printed article was removed from the solvent mixture, the excess solvent was drained, and the materials were air dried for about 1-2 minutes. The softened support structure was then separated from the polyetherimide material by mechanical picking using tweezers. The support structure was easily removed from the article, including intricate areas, without leaving any substantial residue behind.

Example 2

An article was 3D printed with materials and printer combination as described in Example 1. The 3D printed article was then immersed in a solvent mixture of transdichloroethylene and 1,1,1,2,3,4,4,5,5,5-decafluoropentane (commercially available as Microcare SSF) for from 0.5 to 5 hours. The solution was optionally stirred using a magnetic stir bar or other mechanical means. While immersed in the solvent, the polysulfone support areas of the article softened and swelled into a gel-like state. In contrast, when treated for less than 5 hours, the polyetherimide areas did not swell or deform and the original dimensions of the article were maintained through the solvent treatment and the subsequent steps. However, when exposed to the solvent mixture of trans-dichloroethylene and 1,1,1,2,3,4,4,5,5,5-decafluoropentane for 24 hours, both the polysulfone support and the polyetherimide areas of the article were swollen.

After immersion, the article was removed from the solvent mixture, the excess solvent was drained, and the materials were air dried for about 1-2 minutes. The softened support structure was then separated from the polyetherimide material by mechanical picking using tweezers. The support material was easily removed from the article, including intricate areas, leaving only a small residue behind.

Example 3

An article was 3D printed with materials and printer combination as described in Example 1. The article was then immersed in a solvent ketone or a mixture of ketones, such as, but not limited to, 2-butanone (methyl ethyl ketone (MEK)), and acetylacetone for between about 2 hours and about 24 hours. The solution was optionally stirred using a magnetic stir bar or other mechanical means. While immersed in the solvent, the polysulfone support areas of the article softened and swelled into a gel-like state, and/or partially delaminated from the polyetherimide areas of the article. The polyetherimide areas of the article did not swell or deform and the original dimensions were maintained through the solvent treatment and subsequent steps listed below.

After immersion, the article was removed from the solvent or solvent mixture, the excess solvent was drained, and the materials were air dried for about 1-2 minutes. The softened support structure was then separated from the polyetherimide material by mechanical picking using tweezers. Most of the support structure was easily removed from the article, including intricate areas, leaving only traces of residue behind.

Example 4

An article was 3D printed with materials and printer combination as described in Example 1. The article was then immersed in a solvent mixture of 70%, by volume, dimethyl sulfoxide (DMSO) and 30%, by volume, toluene for between about 0.5 hours and about 5 hours. The solution was stirred using a magnetic stir bar or other mechanical means to facilitate dissolution of the polysulfone support structure.

After completely dissolving the polysulfone support structure, the article was removed from the solvent mixture, excess solvent was drained, and the part was dried for about 60 minutes. While the 0.5 to 3 hour immersion completely dissolved the polysulfone support structure, the polyetherimide areas of the article remained intact with the dissolved polysulfone support structure completely removed therefrom. However, after a longer period of immersion, such as about 24 hours, the polyetherimide areas of the article were swollen from the solvent mixture. Note that neither toluene nor DMSO can dissolve the support structure on their own. However, the mixture of the two solvents as described in this example can dissolve the support structure.

Example 5

An article was 3D printed with materials and printer combination as described in Example 1. The article was then immersed in n-methyl 2-pyrollidone (NMP) for between about 0.5 hours and about 3 hours. The solution was stirred using a magnetic stir bar or other mechanical means to facilitate dissolution of the polysulfone support structure.

After completely dissolving the polysulfone support structure, the article was removed from the solvent mixture, excess solvent was drained, and the part was dried for about 60 minutes. The 0.5 to 3 hour immersion completely dissolved the polysulfone support structure, while the polyetherimide build material remained intact and free of the support material, only exhibiting minor swelling. However, after longer periods of immersion, such as about 24 hours, all the areas of the article (polysulfone and polyetherimide) were dissolved.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of forming an article, the method comprising:
    forming a part, the forming of the part including additive manufacturing with a thermoplastic build material and a polymeric support material;
    wherein the thermoplastic build material is selected from the group consisting of a polyetherimide, a blend of polyetherimide with at least one other polymer, a copolymer of polyetherimide with at least one other polymer, and combinations thereof;
    wherein the polymeric support material is selected from the group consisting of a polysulfone, a blend of sulfone polymer with at least one other polymer, a copolymer of sulfone polymer with at least one other polymer, and combinations thereof;
    immersing the part in a solvent;
    wherein the solvent is selected from the group consisting of n-propyl bromide, 1-bromopropane, isopropyl bromide, other propyl bromides, trans-dichloroethylene, 1,1,1,2,3,4,4,5,5,5-decafluoropentane, other halogenated hydrocarbons, 2-butanone(methyl ethyl ketone), acetylacetone, other ketones, and combinations thereof;
    selectively softening the polymeric support material with the solvent;
    removing the part from the solvent; and
    separating the polymeric support material from the thermoplastic build material to form the article.

2. The method of claim 1, wherein the thermoplastic build material comprises at least two thermoplastics.

3. The method of claim 1, wherein the solvent includes a stabilizer selected from the group consisting of, by weight, between 0.01% and 1% nitromethane, between 0.01% and 1% 1,2 butylene oxide, and combinations thereof.

4. The method of claim 1, wherein the softening of the polymeric support material is selected from the group consisting of swelling, crazing, cracking, delaminating, and combinations thereof.

5. The method of claim 1, wherein the separating of the polymeric support material from the build material is selected from the group consisting of manually separating, mechanically separating, and a combination thereof.

6. The method of claim 1, wherein the additive manufacturing is a filament extrusion based process.

7. The method of claim 1, wherein the additive manufacturing is selected from the group consisting of polymer jetting, monomer jetting, binder jetting, and combinations thereof.

8. A method of forming an article, the method comprising:
    forming a part, the forming of the part including additive manufacturing with a thermoplastic build material and a polymeric support material;
    wherein the thermoplastic build material is selected from the group consisting of a polyetherimide, a blend of polyetherimide with at least one other polymer, a copolymer of polyetherimide with at least one other polymer, and combinations thereof;
    wherein the polymeric support material is selected from the group consisting of a polysulfone, a blend of sulfone polymer with at least one other polymer, a copolymer of sulfone polymer with at least one other polymer, and combinations thereof;
    immersing the part in a solvent;
    wherein the solvent is selected from the group consisting of n-methyl 2-pyrollidone (NMP), a mixture of dimethyl sulfoxide and toluene, a dichloromethane co-solvent, a n-n-dimethylformamide (DMF) co-solvent, and combinations thereof;
    selectively dissolving the polymeric support material with the solvent; and
    removing the thermoplastic build material from the solvent;
    wherein the selectively dissolving the polymeric support material removes the polymeric support material from the thermoplastic build material.

9. The method of claim 8, wherein the additive manufacturing is a filament extrusion based process.

10. The method of claim 8, wherein the additive manufacturing is selected from the group consisting of polymer jetting, monomer jetting, binder jetting, and combinations thereof.

* * * * *